United States Patent [19]
Juang et al.

[11] Patent Number: 5,590,242
[45] Date of Patent: Dec. 31, 1996

[54] SIGNAL BIAS REMOVAL FOR ROBUST TELEPHONE SPEECH RECOGNITION

[75] Inventors: Biing-Hwang Juang, Warren; Mazin G. Rahim, Manalapan, both of N.J.

[73] Assignee: Lucent Technologies Inc., Murray Hill, N.J.

[21] Appl. No.: 217,035

[22] Filed: Mar. 24, 1994

[51] Int. Cl.$^6$ ............................. G10L 3/02; G10L 9/00; G10L 5/06
[52] U.S. Cl. .................. 395/2.54; 395/2.31; 395/2.42
[58] Field of Search ........................... 395/2.31, 2.42, 395/2.45, 2.52, 2.54, 2.6

[56] References Cited

U.S. PATENT DOCUMENTS

| | | | |
|---|---|---|---|
| 4,918,731 | 4/1990 | Muroi | 381/43 |
| 5,459,815 | 10/1995 | Aikawa et al. | 395/2.63 |

OTHER PUBLICATIONS

Lee, C. H., Lin, C. H., and Juong, B. H., *A Study on Speaker Adaptation of the Parameters of Continuous Density Hidden Markov Models*, Apr. 1991, IEEE Trans. on Signal Processing, pp. 806–814.

Linde, Y., Buzo, A., and Gray, R. M., *An Algorithm for Vector Quantizer Design*, Jan, 1980, IEEE Trans. on Communications, pp. 84–95.

Acero, A., "Acoustical and Environmental Robustness in Automatic Speech Recognition," Carnegie Mellon Univ., Pittsburgh, Pa, 141 pages, Sep. 13, 1990.

Acero, A., Stern, R. M., "Environmental Robustness in Automatic Speech Recognition," IEEE, pp. 849–852, 1990.

Aikawa, K., et al., "A Dynamic Cepstrum Incorporating Time–Frequency Masking and Its Application to Continuous Speech Recognition," ICASSP-93—1993 IEEE Int'l Conf. on Acoustics, Speech, and Signal Processing, Minneapolis, Minnesota, pp. II–668–II–671, Apr. 27–30, 1993.

Che, C., et al., "Microphone Arrays and Neural Networks for Robust Speech Recognition," pp. 321–326.

Coz, S. J., Bridle, J. S., "Unsupervised Speaker Adaptation by Probabilistic Spectrum Fitting," IEEE, pp. 294–297.

Furui, S., "Toward Robust Speech Recognition Under Adverse Conditions," pp. 31–42.

Furui, S., "Unsupervised Seaker Adaptation Based on Hierarchical Spectral Clustering," IEEE Transactions on Acoustics, Speech, and Signal Processing, vol. 37, No. 12, pp. 1923–1930, Dec. 1989.

Gales, M. J. F., Young, S. J., "Cepstral Parameter Compensation for HMM Recognition in Noise," 11 pages, Feb. 9, 1993.

Gales, M. J. F., Young, S. J., "HMM Recognition in Noise Using Parallel Model Combination," 4 pages.

Gales, M. J. F., Young, S. J. "Robust Continuous Speech Recognition Using Parallal Model Combination," CUED/F–INFENG/TR 172, 17 pages, Mar. 1994.

Hermansky, H. "An Efficient Speaker–Independent Automatic Speech Recognition by Simulation of Some Properties of Human Auditory Perception," IEEE, pp. 1159–1162, 1987.

Hermansky, H., et al., "RASTA–PLP Speech Analysis Technique," IEEE, pp. I–121–I–124, 1992.

(List continued on next page.)

*Primary Examiner*—Allen R. MacDonald
*Assistant Examiner*—Indranil Chowdhury

[57] ABSTRACT

A signal bias removal (SBR) method based on the maximum likelihood estimation of the bias for minimizing undesirable effects in speech recognition systems is described. The technique is readily applicable in various architectures including discrete (vector-quantization based), semicontinuous and continuous-density Hidden Markov Model (HMM) systems. For example, the SBR method can be integrated into a discrete density HMM and applied to telephone speech recognition where the contamination due to extraneous signal components is unknown. To enable real-time implementation, a sequential method for the estimation of the bias (SSBR) is disclosed.

13 Claims, 7 Drawing Sheets

OTHER PUBLICATIONS

Hermansky, H., et al., "Recognition of Speech in Additive and Convolutional Noise Based on RASTA Spectral Processing," IEEE, pp. II–83–II–86, 1993.

Juang, B. H., "Speech Recognition in Adverse Environment," Computer Speech and Language, 5, pp. 275–294, 1991.

Juang, B. H., Paliwal, K. K., "Vector Equalization in Hidden Markov Models for Noisy Speech Recognition," IEEE, pp. I–301–I–304, 1992.

Lim, J. S., Oppenheim, A. V., "Enhancement and Bandwidth Compression of Noisy Speech," Proceedings of the IEEE, vol. 67, No. 12, pp. 1586–1604, Dec. 1979.

Liu, F.–H., et al., "Environment Normalization for Robust Speech Recognition Using Direct Cepstral Comparison," 4 pages.

Mellor, B. A., Varga, A. P., "Noise Masking in a Transform Domain," BCC, pp. II–87–II–90, 1993.

Mokbel, C., et al., "On Line Adaptation of a Speech Recognizer to Variations in Telephone Line Conditions," pp. 1247–1250.

Moreno, P. J., Stern, R. M., "Sources of Degradation of Speech Recognition in the Telephone Network," IEEE, pp. I–109–I–112, 1994.

Morgan, N., Hermansky, H., "RASTA Estensions: Robustness to Additive and Convolutional Noise," 4 pages, Sep. 10, 1992.

Neumeyer, L., Weintraub, M. "Probabilistic Optimum Filtering for Robust Speech Recognition," ICASSP '94, 4 pages.

Rose, R. C., Hofstetter, E. M., "Techniques for Robert Word Spotting in Continuous Speech Messages," 4 pages.

Stern, R. M., et al., "Multiple Approaches to Robust Speech Recognition," 6 pages.

Varga, A. P., Moore, R. K., "Hidden Markov Model Decomposition of Speech and Noise," IEEE, pp. 845–848, 1990.

Vaseghi, S. V. Milner, B. P., "Noisy Speech Recognition Based on HMMs, Winer Filters, and Re–evaluation of Most Likely Candidates," IEEE , pp. II–103–II–106, 1993.

Weintraub, M., Neumeyer, L., "Constructing Telephone Acoustic Models from a High–Quality Speech Corpus," ICASSP'94, 4 pages.

Young, S. J., "Cepstral Mean Compensation for HMM Recognition in Noise," pp. 123–126.

Zhao, Y. "Self–Learning Speaker Adaption Based on Spectral Variation Source Decomposition," Speech Communication, pp. 359–362, 1993.

| DATABASE | ERROR % | BASELINE | SBR | SBR* | CMS | CMS* |
|---|---|---|---|---|---|---|
| DB1 | INS | 0.30 | 0.25 | 0.27 | 0.27 | 0.22 |
|  | DEL | 0.30 | 0.25 | 0.27 | 0.31 | 2.9 |
|  | SUB | 1.37 | 1.26 | 1.28 | 1.34 | 6.50 |
|  | DIGIT | 1.96 | 1.75 | 1.83 | 1.92 | 9.65 |
| DB2 | INS | 0.41 | 0.44 | 0.52 | 0.52 | 0.38 |
|  | DEL | 1.20 | 0.53 | 0.60 | 0.69 | 5.01 |
|  | SUB | 1.69 | 0.99 | 1.14 | 1.12 | 6.23 |
|  | DIGIT | 3.31 | 1.96 | 2.26 | 2.33 | 11.62 |

| DATABASE | BASELINE | SBR | SSBR | CMS |
|---|---|---|---|---|
| | (1) | (2) | (3) | (4) | (5) |
| DB1 | 1.96 | 1.75 | 2.07 | 1.92 |
| DB2 | 3.31 | 1.96 | 2.09 | 2.33 |

| STRING LENGTH | MEL CEPSTRUM | |
|---|---|---|
| | BEFORE SBR | AFTER SBR |
| 2 | 3.1 | 3.1 |
| 3 | 6.0 | 6.0 |
| 4 | 7.5 | 5.9 |
| 5 | 8.9 | 7.6 |
| 6 | 8.9 | 7.9 |
| 7 | 9.8 | 9.0 |

SIGNAL BIAS REMOVAL FOR ROBUST TELEPHONE SPEECH RECOGNITION

TECHNICAL FIELD

This invention relates to a method for removing a signal bias from a transmitted speech signal. In particular, the present invention is a signal bias removal method which may be integrated into a Hidden Markov Model (HMM)-based speech recognition system to minimize the effects of unknown adverse conditions that typically contaminate the speech signal in a telephone channel.

BACKGROUND OF THE INVENTION

A speech signal transmitted through a telephone channel often encounters unknown variable conditions which significantly deteriorate the performance of state-of-the-art Hidden Markov Model (HMM)-based speech recognition systems. Undesirable components due to ambient noise and channel interference, as well as different sound pick-up equipment and articulatory effects, render such recognition systems unsuitable for many real-world applications.

Noise is usually considered to be additive to the speech signal. The spectrum of a real noise signal, such as that produced from fans and motors, is generally not flat and can often cause a considerable degradation in the performance of a speech recognizer.

Channel interference, both linear and non-linear, can also have a serious impact on a speech recognizer. An effect of a typical telephone channel is that it band pass filters the transmitted signal between 200 Hz and 3200 Hz, with variable attenuations across the different spectral bands. If this filtering action is not made consistent when training and testing a speech recognizer, severe consequences on the performance may result. In addition, the use of different microphone transducers can create an acoustic mismatch in the training and the testing conditions.

Another source of degradation in the performance of a speech recognizer pertains to articulation effects. Changes in articulation usually occur due to environmental influences (known as the "Lombard effect"), but may occur merely when speaking to a machine. Articulation effects are a major concern in telephone speech recognition, especially in situations where, for example, a customer is talking to an automatic speech recognizer from a public phone-booth situated near a major highway.

Prior art efforts to minimize extraneous signal components for robust speech recognition have centered upon three major areas. First, processing the speech signal to remove an estimate of the noise. Typical examples include spectral subtraction, cepstral normalization, noise masking and robust feature analysis. Second, adapting the recognizer's models to noise without modifying the speech signal. Third, applying a robust distortion measure that emphasizes the regions of the spectrum that are less corrupted by noise.

SUMMARY OF THE INVENTION

The present invention addresses the problem of unknown signal bias contamination of a speech signal by introducing a signal bias removal (SBR) method into a speech recognition system. The SBR method separates an estimate of the bias signal from the input speech signal. This differs from prior art methods that are designed to normalize or to correct the cepstral vectors. In addition, the separation formulation can be done in the observation space as well as in the probability space.

The SBR method may be utilized during both training and testing in a speech recognition system. After performing feature analysis on a training speech signal, an estimate of the bias is computed based on maximizing a likelihood function. Next, the estimate of the bias is subtracted from the speech signal to arrive at a tentative speech value. Computing the estimate of the bias and subtracting the estimate from the signal are repeated a predetermined number of times, and each iteration uses the previous tentative speech value to compute the next bias estimate to arrive at a reduced bias speech signal value. Next, a codebook of centroids is generated, and then the estimate of the bias is recomputed and subtracted from the tentative speech signal again until an optimal set of centroids are generated. The reduced bias speech signal value and optimal centroids are then used as the training input to the speech recognizer. The testing phase then consists of utilizing the codebook generated during training to compute an estimate of the bias for each utterance based on maximizing a likelihood function, subtracting the estimate of the bias from the speech signal to obtain a tentative speech value, and then repeating these two steps a preset number of times to result in a reduced bias speech value. The reduced bias speech value is then used as the input for the speech recognizer.

A further aspect of the present invention is that the SBR method may be applied after a speech recognition system has undergone any suitable training phase. Thus, SBR can be used in the testing phase only, utilizing the set of centroids generated during the training phase.

Yet another aspect of the invention concerns a sequential SBR method (SSBR) which permits real-time implementation of the invention on current platform recognizers without any major structural change. The SSBR method enables the processing of the bias at the frame level, rather than at the utterance level, without imposing a look-ahead frame delay.

The SBR and SSBR methods are readily applicable to various HMM architectures, such as discrete (Vector Quantization-based), semi-continuous and continuous density HMM systems. In addition, for both the SBR and the SSBR methods, bias removal is carried out as an independent process following feature analysis and preceding recognition. Thus, the present invention may be integrated into a discrete density HMM system used for telephone speech recognition.

DETAILED DESCRIPTION

Figure 1:
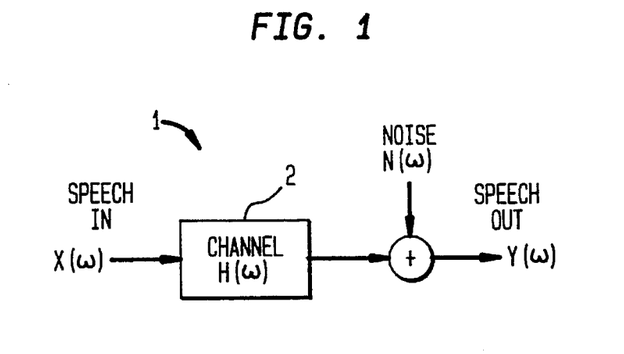
FIG. 1 is a block diagram of a distorted telephone network.

FIG. 1 is a schematic block diagram of a distorted telephone network 1. A telephone speech signal $X(\omega)$ encounters a distortion effect having a multiplicative component, $H(\omega)$, due to distortion in the telephone channel 2, and an additive component, $N(\omega)$, representative of the ambient noise. If $X(\omega)$ is the power spectrum of the original speech signal, then the received contaminated signal, $Y(\omega)$, is modeled as:

$$Y(\omega)=H(\omega)\cdot X(\omega)+N(\omega),$$

where $H(\omega)$ and $N(\omega)$ are "biases" which are assumed to be relatively constant throughout each utterance sequence. The present invention estimates these biases and minimizes, or removes, their effects from the contaminated signal $Y(\omega)$.

Figure 2A:
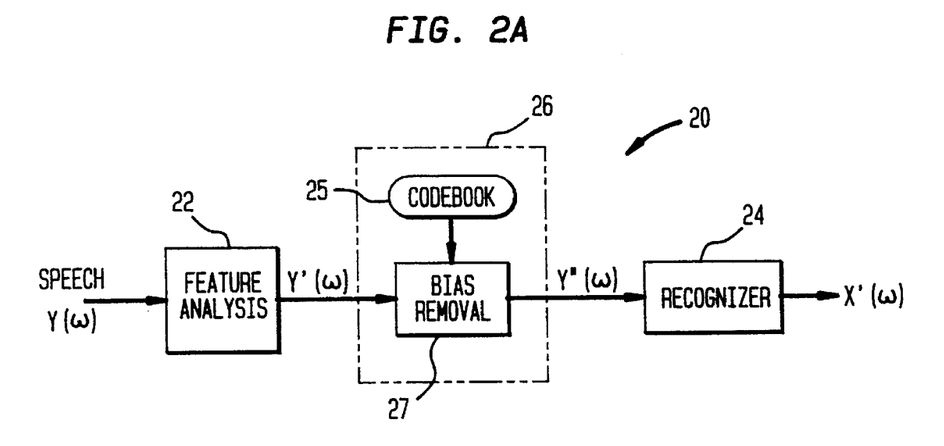
FIG. 2A is a block diagram illustrating the integration of the signal bias removal technique of the present invention in a speech recognition system.

FIG. 2A is a schematic block diagram of a speech recognition system 20 incorporating the present invention. The distorted signal $Y(\omega)$ from a telephone channel is input to a feature analysis block 22, which performs a sequence of feature measurements to form a "test pattern". The feature measurements are typically the output of any of several known spectral analysis techniques, such as filter bank analysis or a linear predictive coding (LPC) analysis. Typically, a bank of bandpass filters is used to screen the speech signal, and then a microprocessor is used to process the filtered signals. The results of the feature analysis are a series of vectors that are characteristic of the time-varying spectral characteristics of the speech signal. A codebook of these distinct analysis vectors is usually generated by one or more microprocessors utilizing a vector quantization (VQ) technique. Vector quantization is known in the art, and is sometimes used as a preprocessor step to perform preliminary recognition decisions in order to reduce the computational load of a recognizer 24.

Referring again to FIG. 2A, the output signal of the feature analysis block 22, $Y'(\omega)$, is used as the input to a signal bias removal (SBR) block 26. The SBR block 26 comprises a codebook 25 and a bias removal section 27. The SBR block 26 first computes an estimate of the bias in the speech signal, and then removes the estimated bias to generate a signal $Y''(\omega)$ for input to a speech recognizer 24. The recognizer 24 characterizes the spectral properties of the frames of the speech pattern to output a text signal $X'(\omega)$, which approximates the original speech signal $X(\omega)$ with the bias removed. One well-known and widely used recognition technique which can be used by one or more microprocessors to perform speech recognition is the Hidden Markov Model (HMM) approach for generating the text output. The present invention provides the recognizer 24 with a speech signal $Y''(\omega)$ which contains a reduced amount of noise, thus permitting its output $X'(\omega)$ to more closely approximate the input speech signal $X(\omega)$.

Figure 2B:
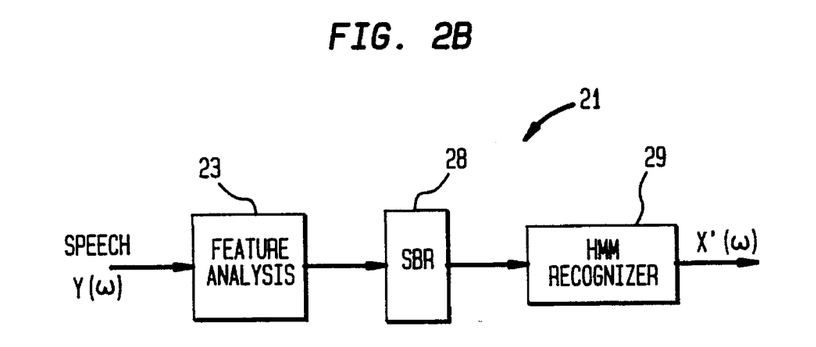
FIG. 2B is a block diagram illustrating the integration of the signal bias removal technique of the present invention in an HMM-based recognition system.

FIG. 2B illustrates the integration of the SBR method 28 in a discrete density HMM recognizer system 21. As shown, the bias removal is carried out as an independent process following feature analysis 23 and preceding the HMM recognizer 29. This type of architecture enables the SBR technique to become an integrated part of the discrete density HMM, and the same method can be extended to or used as a front end processor for other HMM structures.

The following derivation of the SBR method considers only the multiplicative spectral bias $H(\omega)$, however, the process of dealing with both biases, $H(\omega)$ and $N(\omega)$, relies on the same algorithmic development. Further, the formulation of the SBR method can be applied utilizing both spectral analysis and cepstral analysis. Cepstral coefficients are the coefficients of the Fourier transform representation of the log magnitude spectrum, and are known to provide a reliable feature set for speech recognition.

The SBR method is based on maximizing the likelihood of a speech model in which the bias is considered as the unknown parameter. The likelihood function is defined as:

$$p(X|\Lambda) = \Pi_t \max_i p(x_t|\lambda_i),$$

where $$X=\{x_1, x_2, \ldots, x_t, \ldots, x_T\},$$

is an observation sequence of T frames. The speech model is $\Lambda=\{\lambda_i, i=1, 2, \ldots, M\}$, where $\lambda_i$ is the Markov model for a speech unit "i". The index t denotes the frame number ranging from 1 to T. Note that if the Markov chain in $\Lambda$ is of zero$^{th}$ order or equiprobable, then the likelihood function defined above is equivalent to a nearest neighbor (or vector quantization—"VQ") model. Furthermore, in its simplest form, $\lambda_i$ can be just a codeword or centroid in the VQ codebook, where $\omega$ is assumed to be "bias free".

Assuming an additive bias term, b, then with a simplified notation:

$$y_t=x_t+b$$

and $$Y=\{y_1, y_2, \ldots, y_t, \ldots, y_T\},$$

and then $$p(Y|b)=p(Y-b).$$

The likelihood function thus becomes:

$$p(Y|b, \Lambda) = \prod_t \max_i p(y_t - b|\lambda_i),$$

and the maximum likelihood bias estimator, $\bar{b}$, is the one that achieves:

$$p(Y|\bar{b}, \Lambda) = \max_b p(Y|b, \Lambda).$$

The solution for the maximum likelihood bias estimate, $\bar{b}$, can be found by using an iterative procedure.

Consider a Gaussian local observation:

$$p(y_t|b, \lambda_i) = K_i \exp\{-\tfrac{1}{2}[(y_t - b) - \mu_i]' E_i^{-1}[(y_t - b) - \mu_i]\},$$

where $\lambda_i = (\mu_i, E_i)$ = mean, covariance), and $K_i$ is the normalizing constant which does not depend on the bias b. Note that independence among the features is assumed, and thus $E_i = I$, the identity matrix. With an existing bias vector b, each adjusted observation is:

$$\tilde{x}_t = y_t - b$$

and its nearest neighbor can be solved for, such that:

$$z_t = \mu_i = \arg\max_j p(y_t|b, \lambda_j)$$
$$= \arg\max_j p(\tilde{x}_t|\lambda_j).$$

The likelihood function thus becomes:

$$p(Y|b, \Lambda) = K \exp\left\{ -\tfrac{1}{2} \sum_t (y_t - b - z_t)' \cdot (y_t - b - z_t) \right\},$$

where K is a constant that does not depend on the bias, b. By maximizing the quadratic function for $p(Y|b, \Lambda)$ with respect to the bias vector b, a unique solution for the bias estimate is guaranteed:

$$\bar{b} = \frac{1}{T} \sum_{t=1}^{T} (y_t - z_t).$$

An updated nearest neighbor search is then conducted:

$$\bar{z}_t = \mu_i = \arg\max_j p(y_t|\bar{b}, \lambda_j),$$

and it is ensured that:

$$p(Y|b, \Lambda) \leq K \exp\left\{ -\tfrac{1}{2} \sum_t (y_t - \bar{b} - z_t)' \cdot (y_t - \bar{b} - z_t) \right\} \leq$$

$$K \exp\left\{ -\tfrac{1}{2} \sum_t (y_t - \bar{b} - \bar{z}_t)' \cdot (y_t - \bar{b} - \bar{z}_t) \right\} = p(Y|\bar{b}, \Lambda).$$

Therefore, by iteratively and interleavingly finding the best codeword, $z_t$, and obtaining the best "tentative" bias estimate, $\bar{b}$, the likelihood function of the bias vector b is increased until a local optimal, or fixed point, solution for b is reached. Note that the original, distorted process Y is split into two processes $\tilde{X}$ and $\tilde{B} = Y - \tilde{X}$. If $\tilde{X}$ is a reasonable estimate of the undistorted signal X, and B is assumed to be stationary, it is then reasonable to assume $\tilde{B}$ to be stationary and the maximum likelihood bias estimate $\bar{b}$ to be a good estimate of the true value of the bias b. Note that an alternative implementation is to gradually reduce the bias in the signal at each frame, $y_t$, as the iteration progresses; that is, at the $n^{th}$ iteration:

$$\bar{b}^{(n)} = \frac{1}{T} \sum_{t=1}^{T} [(y_t - \bar{b}^{(n-1)} - \bar{b}^{(n-2)} \ldots - \bar{b}^{(0)}) - z_t],$$

where $z_t$ is defined with:

$$\tilde{x}_t = y_t - \bar{b}^{(n-1)} - \bar{b}^{(n-2)} \ldots - \bar{b}^{(0)}.$$

This leads to the same results of maximum likelihood. Also, note that a fixed point solution is reached, $\bar{b}^{(n)} \to 0$, as n gets larger.

For example, a discrete density HMM speech recognition system typically utilizes the generalized Lloyd algorithm to compute a locally optimal set of code vectors or centroids to minimize the empirical quantization error. In the maximum likelihood formulation of a traditional vector quantizer design, a bias term is included which is assumed to be constantly zero. To utilize the SBR method, an identical formulation is used except that the centroids are held constant while the bias is treated as an unknown, to be estimated by the maximum likelihood method. Therefore, given a set of centroids, $\mu_i$, which are computed by the generalized Lloyd algorithm, the SBR method in a discrete density HMM framework can be carried out for the training and testing phases of the speech recognition system.

Figure 3:
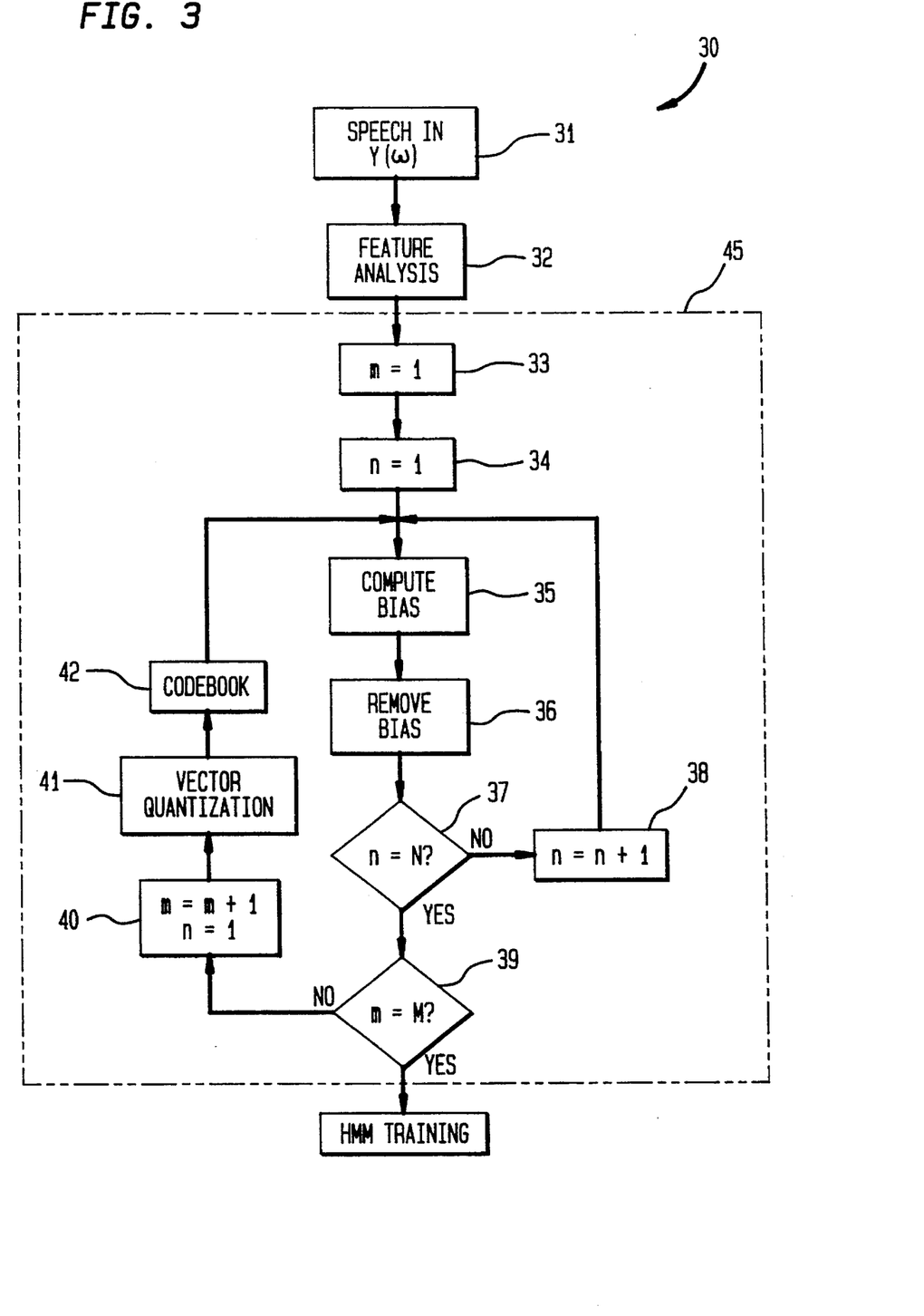
FIG. 3 is a flowchart illustrating the use of the invention when training a speech recognition system.

FIG. 3 is a flowchart 30 of the implementation of the SBR technique during training of an HMM speech recognition system. A training speech signal $Y(\omega)$, at step 31, undergoes feature analysis at step 32 to generate cepstral coefficients. A first index m is set equal to one at step 33, and a second index n is also set equal to one at step 34. An estimate of the spectral bias, $\bar{b}$, is computed at step 35 for each utterance of T frames, such that:

$$\bar{b} = \frac{1}{T} \sum_{t=1}^{T} (y_t - z_t),$$

where the best codeword $z_t$ is the "nearest neighbor" to the distorted signal spectrum $y_t$:

$$z_t = \arg\min_i d(y_t, \mu_i).$$

One of such distortion criteria consistent with the solution for the bias estimate $\bar{b}$ is the Euclidean distance:

$$d(y_t, \mu_i) = (y_t - \mu_i)' \cdot (y_t - \mu_i).$$

Subsequently, the bias estimate $\bar{b}$ is subtracted from the distorted signal in step 36, so that:

$$\tilde{x}_t = y_t - \bar{b}; \quad 1 \leq t \leq T,$$

resulting in a tentative training speech value, $\tilde{x}_t$, which is a maximization of the likelihood function $p(x|\Lambda)$ described above. Next, the index n is checked in step 37 to see if a preset number N has been reached. If not, n is incremented by 1 in step 38, and the bias estimate is recomputed in step 35 using the tentative training speech value. This process is repeated until n=N, then step 39 is reached. At step 39 the second index m is checked to see if a predetermined number M has been reached. If not, in step 40 the first index n is reset to equal one and the second index m is incremented by one. Next, vector quantization is performed in step 41 and a new codebook having a new set of centroids ($\mu_i \rightarrow \mu_i^{(j)}$) is generated in step 42. Once again, a new estimate of the bias, $\bar{b}$, is computed and then removed from the tentative training speech value $\tilde{x}_t$. Thus, this entire procedure is iterated until M is reached, using the tentative speech value $\tilde{x}_t$ rather than $y_t$, to ensure a reduction in the bias (also the quantization error), and a further maximization of the likelihood function. When M is reached, the training speech value and optimal centroids obtained are used for training the HMM recognizer at step 43. In FIG. 3, the dotted line box 45 demarcates those steps which comprise the SBR method of the present invention.

Figure 4:
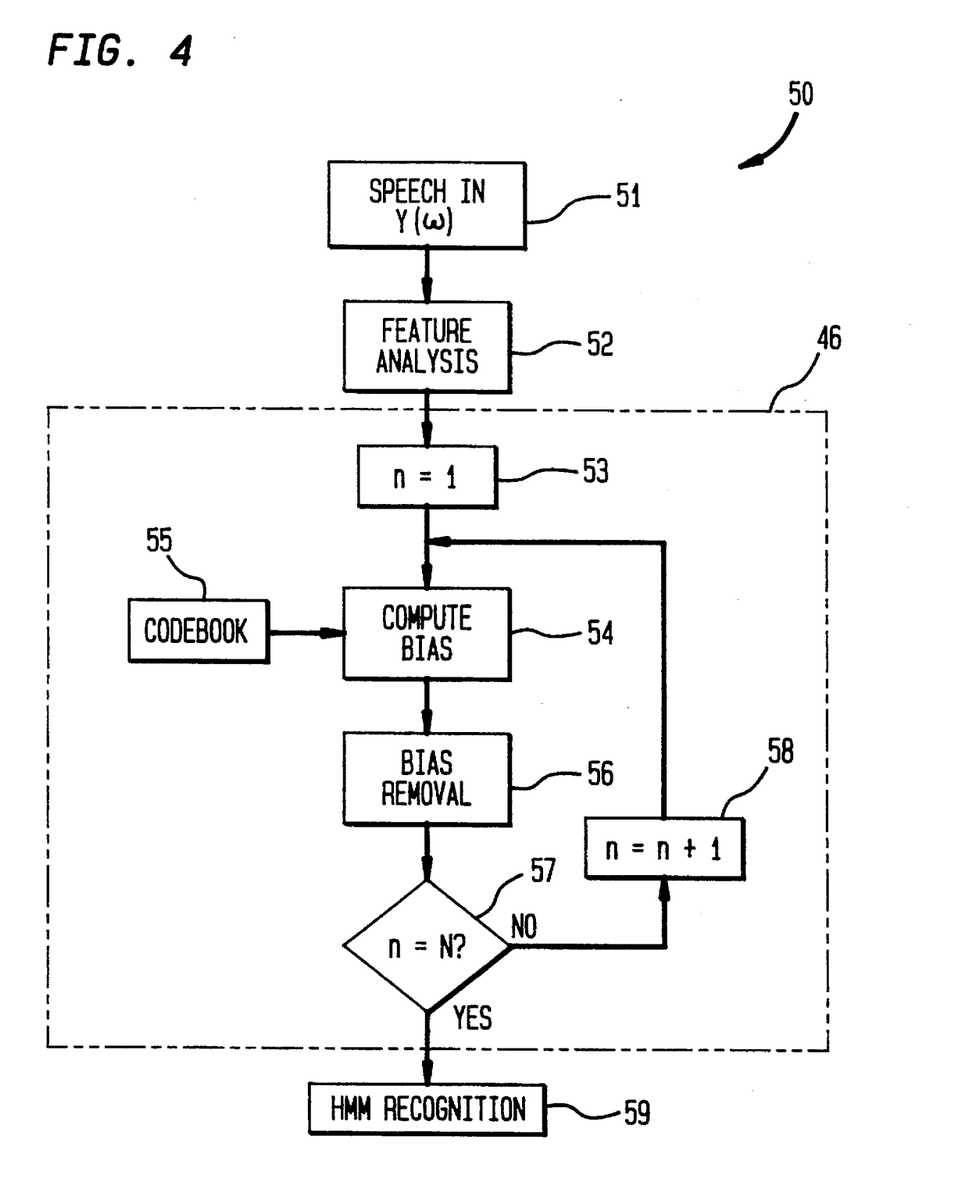
FIG. 4 is a flowchart illustrating the use of the invention when testing an input speech signal in a speech recognition system.

FIG. 4 is a flowchart 50 of the SBR technique used during the testing phase of an HMM recognition system, after the HMM recognizer has already been trained. Optimally, the HMM recognizer was trained using the SBR method explained above with respect to FIG. 3. However, other training techniques can be used as long as a codebook of centroid vectors was generated.

Referring to FIG. 4, a contaminated speech signal 51, $Y(\omega)$, is input to the system, and feature analysis of the signal is performed at step 52 to generate cepstral coefficients. An index n is set equal to one at step 53, and then an estimate of the bias $\bar{b}$ is computed as described above, in step 54, using the codebook 55 that was generated during training. The bias estimate $\bar{b}$ is then subtracted from the speech signal in step 56 to generate a tentative speech signal $\tilde{x}_t$. Next, if the index n has not reached a predetermined number N in step 57, then n is incremented by one in step 58, the bias is recomputed in step 54 and removed from the speech value to form a new tentative speech signal. This process continues until the predetermined number N is reached at which point the resulting reduced bias signal is fed to an HMM recognizer in step 59 for processing. The dotted line box 46 demarcates the steps of the SBR process. Thus, the equations for computing the bias estimate, $\bar{b}$, and best codeword, $z_t$, are repeated with the new, improved set of centroids until the likelihood function reaches a fixed point. Typically, one or two iterations are adequate to ensure convergence. Note that the nearest neighbor search to find the best codeword, $z_t$, could instead involve a memory structure such as that to be solved by the Viterbi algorithm.

As discussed above, the distorted speech signal $Y(\omega)$ contains two types of biases. These biases can be reduced by the above method in an integrated, iterative manner. After minimizing or removing the additive spectral bias $N(\omega)$, the filtered spectral signal may be transformed into cepstrum:

$$\tilde{x} = x + h,$$

where $\tilde{x} = \text{IDFT}[\log\{\tilde{X}(\omega)\}]$, $x = \text{IDFT}[\log\{X(\omega)\}]$, and $h = \text{IDFT}[\log\{H(\omega)\}]$.

By applying the above two-step procedure for bias removal, using cepstrum rather than spectrum, a new set of centroids is generated which minimizes or removes the additive bias component. This also ensures a maximization of the local likelihood probability. The SBR method can then be iterated several times between the spectral and cepstral domains until extraneous effects are minimized as much as possible.

It should be noted that there is a strong relationship between signal bias removal and cepstral mean subtraction (CMS). In fact, CMS is equivalent to SBR when a one-codeword vector quantizer is used, where $\Lambda = \{\mu_0\}$. If $\mu_0$ is a zero vector, thus assuming that the long term cepstral average of speech is zero, then the SBR method is reduced to CMS, with the bias vector $\bar{b}$ representing the frame cepstral average computed over the whole utterance.

When incorporating SBR to a platform speech recognizer, an important consideration is the look-ahead frame delay necessary for the estimation of the bias. The above discussion assumes that the entire utterance is available prior to computing the bias, which is typically not the case for real-world applications. In many practical systems, a speech utterance is commonly analyzed on a frame-by-frame basis, or frame synchronously. A speech frame is equal to some predefined speech interval, for example, 30 millisecond sections of a speech utterance. Thus, in real world applications, processing is typically carried out in synchronous fashion wherein the first frame is processed by a first microprocessor and then the processed frame passed to one or more other microprocessors for recognition analysis as the first microprocessor starts to work on the next frame of speech. Thus, acoustic features are passed to the recognizer at every frame, instead of in a batch mode wherein the entire speech utterance is analyzed all at once. This process of dealing with each frame individually is crucial for real-time implementation and minimal memory requirements.

Figure 5A:
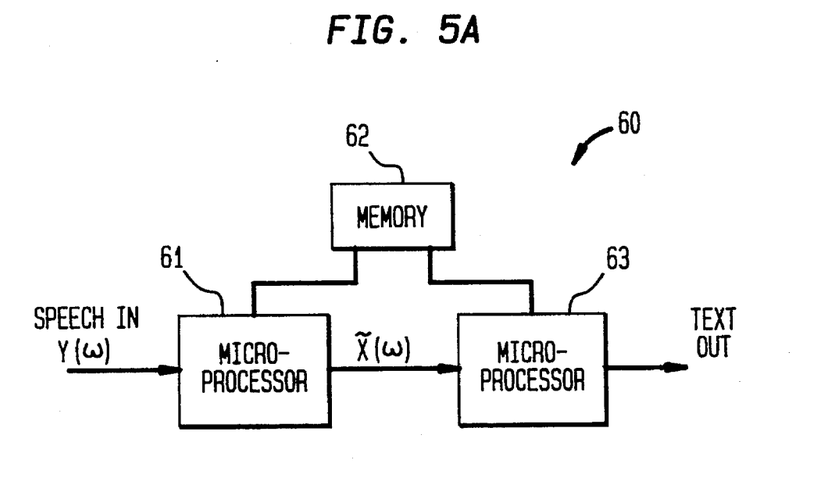
FIG. 5A is a block diagram illustrating an apparatus incorporating the present invention.

FIG. 5A is a block diagram 60, illustrating a speech recognition that can incorporate the present invention. A contaminated speech signal $Y(\omega)$ is input to a first microprocessor 61 which performs feature analysis using software routines stored in a shared memory 62, which comprises both random-access and read-only memory. The first microprocessor 61 also implements the SBR process of the present invention, and speech data is stored in the memory 62. The output speech signal $\tilde{x}(\omega)$ from the first microprocessor is then input to a second microprocessor 63, which performs speech recognition to generate the text output.

Figure 5B:
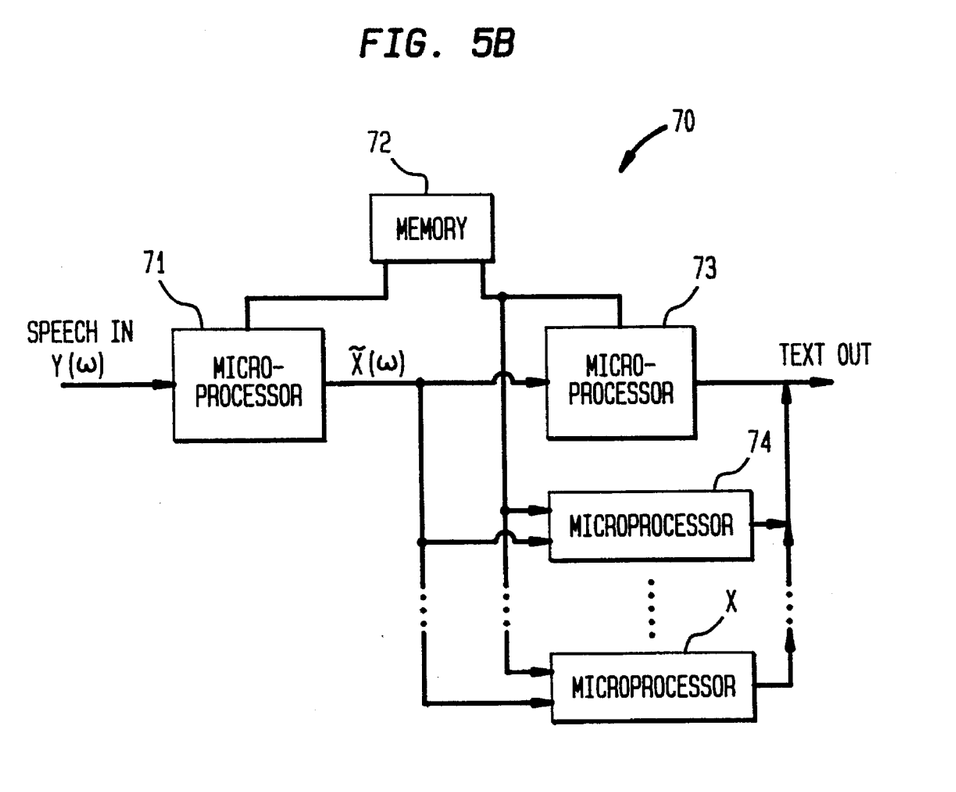
FIG. 5B is a block diagram illustrating another apparatus incorporating the present invention.

FIG. 5B is a block diagram 70 illustrating another speech recognition speech recognition apparatus which may incorporate the invention. A contaminated speech signal $Y(\omega)$ is input to a first microprocessor 71, and once again a shared memory 72, comprising both random access and read-only memory, is used for data storage. A plurality of microprocessors (73, 74 to X) process the output speech signal $\tilde{x}(\omega)$ from the first microprocessor to perform speech recognition resulting in the text output. An apparatus such as that shown in FIG. 5B is typically used to process a speech utterance on a frame-by-frame basis wherein each microprocessor 73, 74 to X may operate on different frames as the utterance is processed. Thus, the present invention can be utilized as a modular addition to the first microprocessor's routines without the need to modify the process used in the speech recognizer and without requiring additional hardware. This modular characteristic is advantageous for use with existing speech recognition systems.

When not all of the frames of the test utterance are simultaneously available for the computation of the bias vector $\bar{b}$, there are two possibilities to consider. First, a two-pass process may be applied where the bias vector as well as other intensive operations are computed in the first pass, leaving the second pass to perform recognition. Second, a sequential method for bias removal may be applied such as sequential signal bias removal (SSBR). If SSBR is to be conducted frame synchronously, then there exist many possible solutions, one of which is outlined below.

If $\bar{b}_{t-1}$ denotes the average bias vector at the $(t-1)^{th}$ frame, and $b_t$ is the deviation vector at frame $t$ ($b_t = y_t - z_t$), then:

$$\bar{b}_t = \alpha \cdot \bar{b}_{t-1} + (1-\alpha) \cdot b_t, \quad 0 \leq \alpha \leq 1,$$

and $$\tilde{x}_t = y_t - \bar{b}_t,$$

where $\alpha$ is a weighting coefficient. Note that the estimate of the deviation vector $\bar{b}_t$ is computed iteratively, such that:

$$\bar{b}_t = \bar{b}_t^{(n-1)} + \bar{b}_t^{(n-2)} + \ldots + \bar{b}_t^{(0)},$$

where n is the number of iterations for reestimating the bias and $\bar{b}^{(n-1)}$ is the sequential bias estimate at iteration $n-1$ and frame t. In order to ensure that the sequential bias estimate at $t=T$ is equivalent to that computed over the whole utterance, the weighting coefficient $\alpha$ is set to $(t-1)/t$. Other approaches to performing SSBR, such as using a bootstrapped bias estimate or a leaky integrator are possible.

It should be realized that the same procedure outlined above with respect to the above equation for the deviation vector $\bar{b}_t$ can be used to construct a sequential estimate of the cepstral average. Thus, if $\bar{c}_{t-1}$ denotes the average cepstral vector at frame t, and $c_t$ denotes the cepstral vector at frame t, then:

$$\bar{c}_{t-1} = \alpha \cdot \bar{c}_{t-1} + (1-\alpha) \cdot c_t, \quad 0 \leq \alpha \leq 1,$$

and $$\tilde{x}_t = y_t - \bar{c}_t.$$

In order to test the invention, a discrete density HMM recognition system was modified to include the SBR method (see FIG. 2B). During training of the system, an estimate of the cepstral bias was computed for every training utterance and subtracted from it. This procedure of estimating and removing the bias was repeated twenty times, beyond which no significant reduction in the average norm value, or length, of the bias was observed. The cepstral codebook was then recomputed and the overall process was iterated four times to ensure adequate reduction in the norm of the bias, which was also accompanied by a reduction in the quantization error.

The experiments were conducted with an input signal, sampled at 8 kHz, that was initially pre-emphasized $(1-0.95z^{-1})$ and grouped into frames of 256 samples with a frame shift of 80 samples. Each frame was Hamming windowed, Fourier transformed into the power spectral domain, and then passed through a set of 30 triangular band-pass filters. Mel-based cepstral parameters were used, which take advantage of the human auditory system by sampling the spectrum at mel-scale intervals. In order to compute mel-based cepstral parameters, or mel cepstrum, the inverse discrete cosine transform was applied on the smoothed log power spectrum and 12 coefficients were extracted. The first and second order time derivatives of the cepstrum, the delta cepstrum and delta-delta cepstrum, were also computed.

Besides the cepstral-based features, the log of the energy and its first and second order time derivatives were also computed. Thus, each speech frame was represented by a vector of 39 features. Note that the computation of all the higher order coefficients was performed over a segment of five windows.

The input features, namely, 12 cepstrum, 12 delta cepstrum, 12 delta-delta cepstrum, 1 energy, 1 delta energy and 1 delta-delta energy were treated separately for Vector Quantization. The generalized Lloyd algorithm was applied on the entire training data to generate six codebooks, one per feature vector. The codebook size was set to 256 for the cepstrum-derived coefficients, and to 32 for the energy-derived coefficients. Such codebook sizes have been shown to provide a reasonable trade-off between computational complexity and recognition performance. The number of iterations for refining the cluster centroids was set to a maximum of 10, and the generalized Lloyd algorithm employed the L2 norm, with no liftering, for computing the cepstral distance.

The speech recognizer was based on a discrete density HMM using whole word models, one model per digit (1, 2 ..., oh, zero) and per gender, male and female. Models were left-to-right with no skip state transitions. A total of 24 models including silence and pause were used. The number of states for each model varied between one state for silence, and twenty-one states for zero. (The number of states for each digit model was computed using a simplex search optimization method.) Ten iterations of the maximum likelihood estimation were employed during training, followed by three iterations of the maximum mutual information. The latter training criterion was also applied for computing the exponents or weights of the six codebooks. The examples assume unknown length grammar and unenpointed strings both in training and testing.

Two connected digits databases were used to evaluate the robustness characteristics of the signal bias removal method. The databases were recorded over telephone lines by having individuals read digit strings from a predefined list.

The first database, DB1, was collected from five dialectically distinct regions within the United States, namely, Long Island, Chicago, Boston, Columbus, and Atlanta. Each region consisted of 100 adult talkers (50 males and 50 females), each speaking 66 connected digit strings from a predefined list (11 digit strings for each of lengths two through seven). Half of their utterances were recorded using two electret microphone handsets, and the other half using two carbon button microphone hand, sets. Speech was transmitted over a long-distance telephone network that was either all analog, all digital or a mix, depending on the region. A subset of this database consisting of 14629 strings was assigned for training, and a different subset of 7073 strings was assigned for testing.

The second database, DB2, was collected from two dialectically distinct regions, namely, Long Island and Boston, over a digital T-1 interface. Speech was recorded using four different microphone handsets, two electret and two carbon button. Digit strings of lengths 10, 14, 15 and 16 digits, corresponding to credit card numbers and long-distance telephone numbers, were collected from 250 adult talkers (125 males and 125 females). A subset of this database of 2842 strings was utilized for testing only.

Training was performed on the training portion of the first database DB1, and testing was performed on the testing portions of both databases DB1 and DB2. Testing on DB1 was considered as under "matched" conditions, and testing on DB2 was considered as under "mismatched" conditions.

Figure 6:
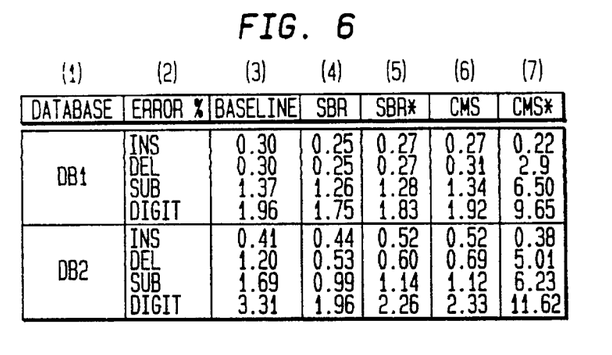
FIG. 6 is a table illustrating the percentage word error and rates of insertion, deletion and subtraction for a baseline system with either SBR or CMS.

In order to quantify the degradation in the recognition performance when training and testing in mismatched training and testing environmental conditions, the table of FIG.

6 shows the error rate for SBR (column 4) when using mel cepstrum, for the baseline recognition. The majority of the errors were due to an increase in the deletion rate, although a moderate rise in the rates of substitution and insertion was observed.

Simulation results are described below that illustrate the capabilities of the SBR method, where the computation of the bias is performed at the utterance level, and the SSBR method or sequential estimate of the bias, when each method is integrated as part of the baseline HMM system. Note that although the formulation of the bias removal method presented earlier is applicable to the spectral domain for noise bias removal, it was strictly employed in the cepstral domain here.

Figure 7:
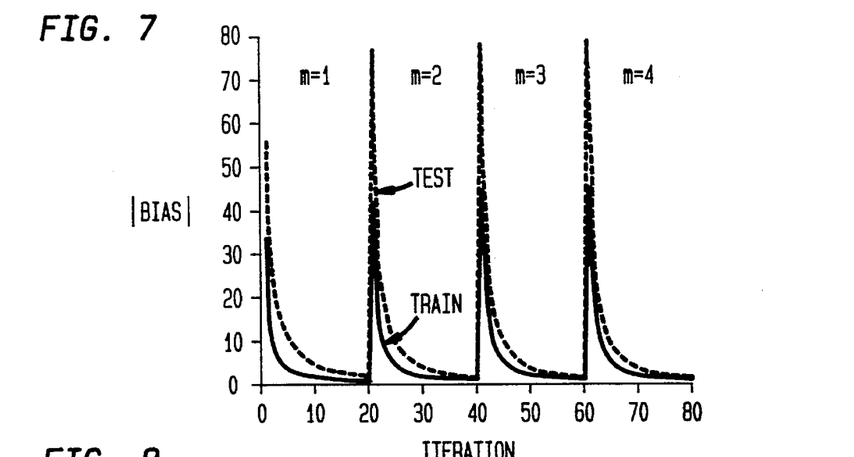
FIG. 7 is a plot of the norm of the cepstral bias averaged over the training and the test data at every iteration of the SBR method.

A plot of the norm of the bias vector $|\bar{b}|$ at every iteration, averaged over all the training data of DB1, is shown in FIG. 7. Note that every time a new codebook was generated, the original "unbiased" data was used for recomputing the bias. This explains the sudden jump in the norm when m is incremented. When the original "unbiased" data or the "biased" data from the proceeding iteration, m−1, was used it led to the same results. Although using the latter alternative would ensure a faster convergence, it is expensive since additional memory storage is then required for the processed data at every iteration. Further, no significant reduction in the norm value of the bias beyond m=2 and n=10 [n=iteration] was observed (see FIG. 7), and it approaches zero as the number of iterations increases.

Figure 8:
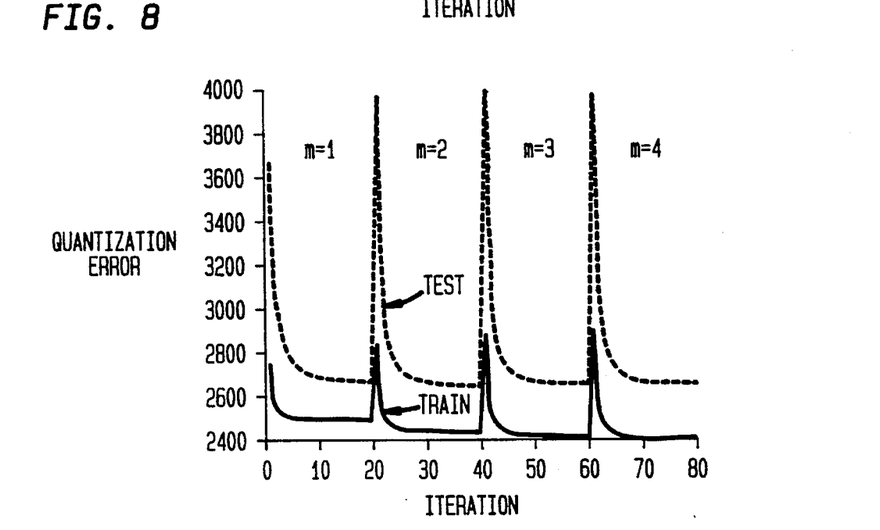
FIG. 8 is a plot of the quantization error averaged over the training and the test data at every iteration of the SBR method.

During recognition, an estimate of the bias was computed for each test utterance and subtracted from the speech signal. Similarly this procedure was repeated twenty times. Each utterance was then passed to the recognizer. FIG. 7 shows the average norm of the cepstral bias for the test data of DB1. Clearly, the norm value becomes approximately zero beyond ten or so iterations, approaching that of the training data. FIG. 8 shows the variations in the quantization error, or the average Euclidean distance, for the training and the testing data at every iteration of the SBR method. The plots indicate a drop in the error by about 30% below its initial starting value, before applying SBR, and is only 6% above that of the training data.

Referring again to FIG. 6, column 4 of the table shows the word error rate when introducing SBR with mel cepstrum. These results suggest that the SBR method is able to reduce the word error rate by as much as 41% for mismatched training and testing conditions (DB2 with mel cepstrum). In addition, the improvement was chiefly due to a reduction in the rates of deletion and substitution by over a half, during mismatched conditions, with the insertion and deletion rates becoming relatively equal.

A similar experiment was also conducted using CMS rather than SBR. Column 6 of FIG. 6 shows the word error rates for CMS when using mel cepstrum. The additional improvements that SBR provides over CMS suggests that having a finite number of codewords for the computation of the bias that span the acoustic feature space, as in the case of SBR, is more rewarding than using a one entry codeword with zero coefficients, as in the case of CMS. The relative reductions in the word error rate when introducing SBR, over CMS, for DB1 and DB2 were 9% and 16%, respectively. A careful examination of the errors that remained following the introduction of SBR showed them to be a subset of those of the CMS method.

An advantage of the SBR method over CMS is that SBR can be employed during the testing phase only, since the bias estimate, $\bar{b}$, is largely dependent on the model, $\Lambda$. Referring to FIG. 6, column 5 (SBR*) of the table shows the results of experiments introducing SBR during testing only. As such, the penalty for not training with SBR is rather small. Further, the same approach cannot be applied when using CMS since the cepstral average, $\bar{c}$, is estimated independently of the model, $\Lambda$. Using CMS during testing only causes an unacceptable degradation in the recognition performance (see FIG. 6, column 7, labelled CMS*).

Figure 9:
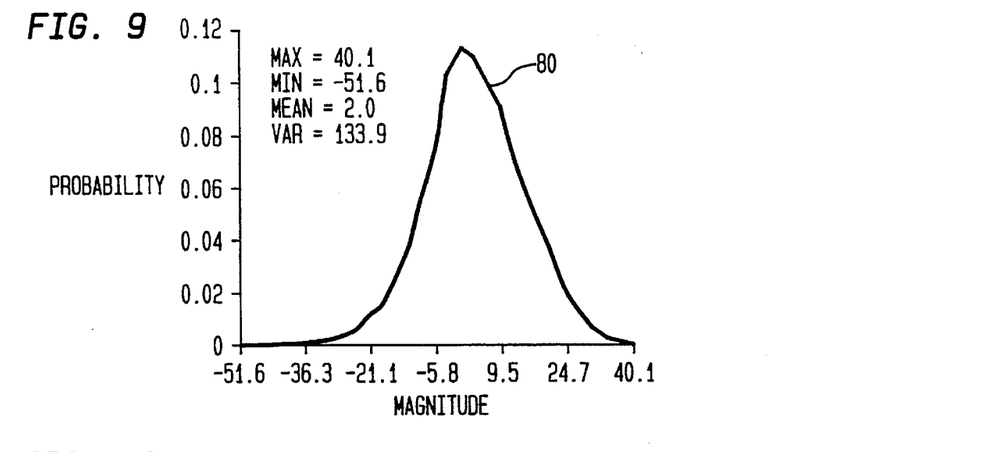
FIG. 9 is a histogram for the second bias coefficient when testing on a first database (DB1)
Figure 10:
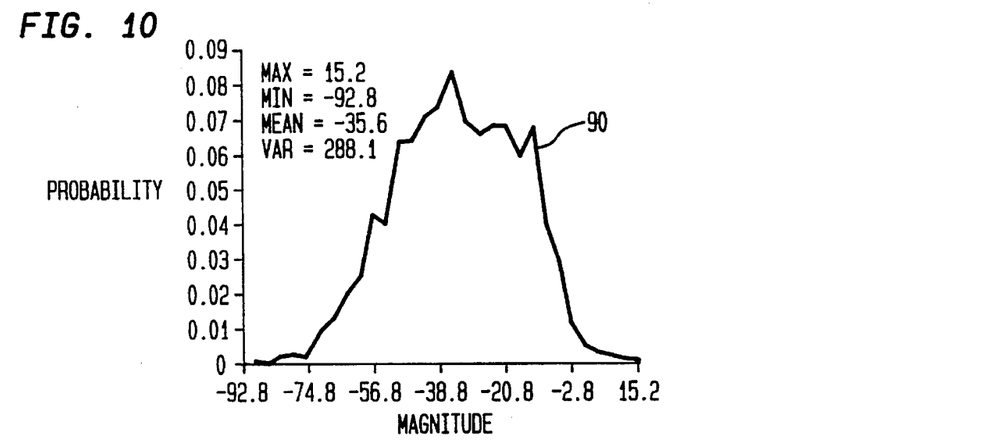
FIG. 10 is a histogram for the second bias coefficient when testing on a second database (DB2)
Figure 11:
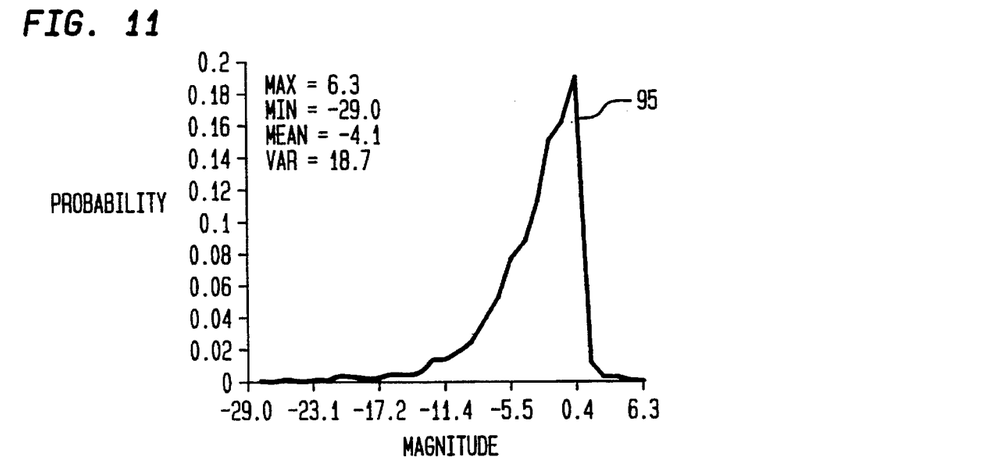
FIG. 11 is a histogram of the second bias coefficient when testing on DB2 following ten iterations of the SBR method.

The effect of SBR on the distribution of the bias is estimated in FIG. 9, which shows a histogram 80, or probability distribution, for the second coefficient of the cepstral bias vector when testing on DB1. This distribution, as well as those of other coefficients, have been observed to have a Gaussian-like shape. However, this was generally not found to be the case for the DB2 database. FIG. 10 shows the distribution 90 for the same coefficient when testing on DB2, and depicts a shifted flat distribution with higher variance and dynamic range. After several iterations of the SBR method, the bias distributions become sharper (smaller variance) and have a smaller dynamic range. This is illustrated in FIG. 11, where the histogram 95 maps to that of FIG. 10 following ten iterations of the SBR method.

All of the previous experiments assumed the existence of the entire utterance for the estimation of the bias, therefore the look-ahead frame delay was equivalent to the size of the input utterance.

As explained above, to realize the SBR method in a frame synchronous mode, a sequential estimate of the bias (SSBR) can be applied for recognition. The SSBR method includes an on-line estimate of the bias that is regularly updated on every frame using the criterion set forth in the equation for the $\bar{b}_t$ bias vector. In the examples which follow, ten iterations were performed for each frame for the computation of the bias vector, $\bar{b}_t$, prior to updating the input signal, $\bar{x}_t$.

Figure 12:
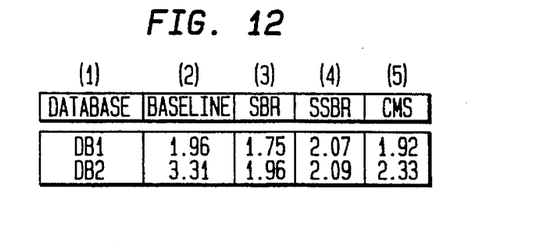
FIG. 12 is a table illustrating the percentage word error for the baseline system with SBR, SSBR, or CMS.

FIG. 12 presents the word error rates when using mel cepstrum for the baseline system (column 2) with either SBR (column 3), or SSBR (column 4), or CMS (column 5). Note that the SSBR method was strictly applied during testing, while training included the application of the SBR method (i.e., results for both the SBR method and the SSBR method utilized the same training models, but differed in the manner of computing the bias during testing). Clearly, the penalty for having a sequential estimate of the bias, as opposed to estimating the bias in a batch mode, is rather small. The relative changes in the word error rate when introducing SSBR, over SBR, for testing on DB1 and DB2 were +15% and +6%, respectively.

One attractive feature of the SBR method is that its formulation does not contain parameters that have to be tuned differently for different databases. The SBR method indicates that by iteratively estimating and subtracting the bias for each individual utterance in the manner presented above, a maximization of the likelihood probability function results.

Another interesting feature of the SBR method when integrated as part of a VQ (or a semi-continuous)-based speech recognition system is that one can apply the same cepstral codebook used by the HMMs for the computation of the bias, thus requiring no additional memory storage.

Figure 13:
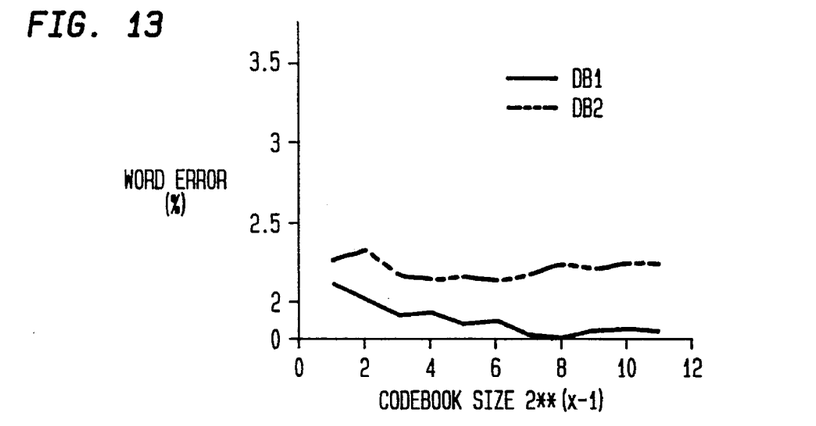
FIG. 13 is a plot of the word error rate as a function of the codebook size when using SBR.

FIG. 13 shows the word error rate for the SBR method as a function of the codebook size, where the codebook size for the computation of the bias was varied from 1 to 1024 entries when testing on DB1 and DB2. These results indicate that a codebook size of 3 to 4 bits (or 8–16 which equals $2^{4-1}$ to $2^{5-1}$) may be sufficient for the computation of the bias without significant loss in performance.

Figure 14:
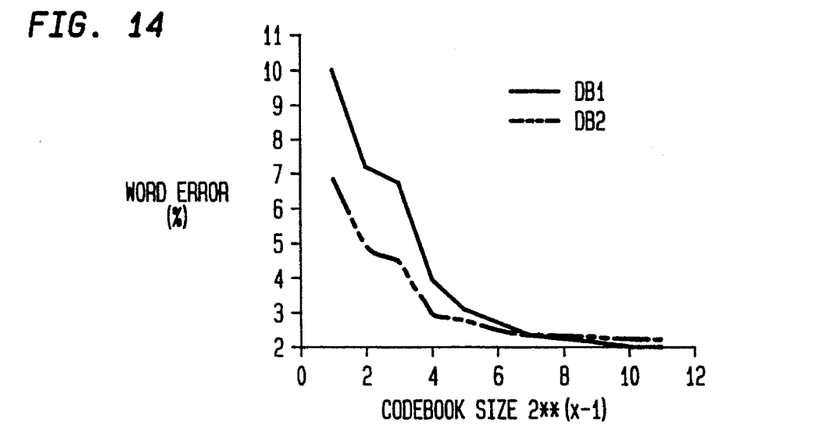
FIG. 14 is a plot of the word error rate as a function of the codebook size when using SSBR.

FIG. 14 shows the word error rate as a function of the codebook size when employing the SSBR method. Introducing a small-sized codebook in this case has a disastrous impact on the recognition performance since the noisy estimate of the bias during the initial part of the utterance causes removal of useful speech information, rather than extraneous signals. Therefore, a much larger codebook (e.g., 128 to 256) is necessary for the SSBR method to have a positive impact on the recognition performance. Thus, when applying sequential signal bias removal to the speech signal, a moderate to a large sized codebook should be used if a minimal look-ahead frame delay is desired. If look-ahead frame delay is of no concern then one may use a small sized codebook (this is the case for SBR).

Figure 15:
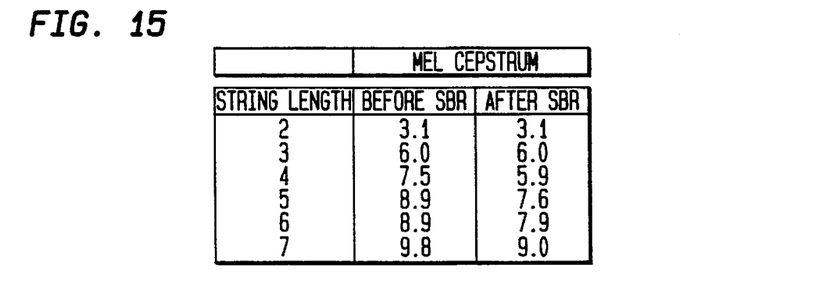
FIG. 15 is a table illustrating the percentage word error for different string lengths before and after utilizing SBR.

A related problem is the issue of what size string is necessary for "adequate" computation of the bias. FIG. 15 is a table which shows the string error rate before and after the application of the SBR method when using mel cepstrum. Although the testing is performed on DB1 under matched conditions, it suggests that a minimum of a three digit string (about 1 second) is necessary in order for the bias removal method to have any positive impact on the recognition performance. Experiments conducted on single digit strings show that the current formulation of the SBR causes a slight degradation of up to 5% in the digit error rate.

In summary, the signal bias removal (SBR) method utilizes an iterative procedure for estimating the bias in the spectral and cepstral domains for the minimization of deleterious signal components in telephone speech recognition. The procedure is based on maximizing the likelihood of a speech model in which the bias is considered as the unknown parameter. The SBR method, as applied in the cepstral domain only, can be integrated as part of a discrete density HMM system. Further, to enable real-time implementation, a sequential signal bias removal method (SSBR) was shown to be effective when processing speech signals on a frame-by-frame basis. Results from experiments using two speaker-independent databases, wherein the data from the speakers consisted of spoken strings of digits, indicate that the SBR method, when applied to a fairly long string of digits, is capable of minimizing extraneous channel distortion, and consequently improving the performance of telephone speech recognition.

Further, the experimental results indicate that when introducing SBR during testing only, as opposed to during both training and testing, the word error rate only rises up to 14%. For CMS, this would result in a jump in the error rate by a factor exceeding three times. This advantage of being able to apply SBR without retraining the recognition models is desirable in all existing applications of speech recognition.

It is to be understood that the above-described embodiments are merely illustrative, and that many variations can be devised by those skilled in the art without departing from the scope of the invention.

We claim:

1. A method for reducing the effect of an unknown signal bias in an input speech signal for use by a speech recognition system, comprising:

(1) training the speech recognition system by using the following steps:
  (a) generating a set of centroids based on a training speech signal;
  (b) computing an estimate of the bias for the training speech signal based on maximizing a likelihood function;
  (c) subtracting the estimate of the bias from the training speech signal to obtain a tentative training speech value;
  (d) repeating steps (b) and (c), wherein each subsequent computed estimate of the bias is based on the previous tentative training speech value to arrive at a reduced bias training speech signal value;
  (e) recomputing the centroids based on the reduced bias training speech signal to generate a new set of centroids;
  (f) repeating steps (b) to (e) to compute a processed reduced bias speech signal and to form an enhanced set of centroids;
  (g) utilizing the enhanced set of centroids and the processed reduced bias speech signal as training input for a speech recognizer;

(2) testing an input speech signal to minimize the unknown bias by using the following steps:
  (h) utilizing the enhanced set of centroids to compute an estimate of the bias for each utterance of the speech signal based on maximizing a likelihood function;
  (i) subtracting the estimate of the bias from the speech signal to obtain a tentative speech value;
  (j) repeating steps (h) and (i), wherein each subsequent computed estimate of the bias is based on the previous tentative speech value, resulting in a reduced bias speech signal value; and (3) utilizing the reduced bias speech signal as input to a speech recognizer.

2. The method of claim 1, wherein the speech recognition system utilizes a Hidden Markov Model speech recognizer.

3. A method for minimizing the effect of an unknown signal bias on an input speech signal during the testing phase of a speech recognition system, comprising:

(a) computing an estimate of the bias for each utterance of the speech signal based on maximizing a likelihood function by initially utilizing a set of centroids generated by a training model;
 (b) subtracting the estimate of the bias from the input speech signal to obtain a tentative speech value;
 (c) repeating steps (a) and (b) a predetermined number of times, wherein each subsequent computed estimate of the bias is based on the previous tentative speech value, resulting in a reduced bias speech signal value; and
 (d) utilizing the reduced bias speech signal value as input to a speech recognizer.

4. The method of claim 3, wherein a vector quantization method is utilized to generate the centroids of step (a).

5. A method for sequentially reducing the effect of an unknown signal bias of an input speech signal for a speech recognition system, comprising:

(1) training the speech recognition system by using the following steps:
  (a) generating a set of centroids based on a training speech signal;
  (b) analyzing the speech signal on a frame by frame basis or in a batch mode;
  (c) computing an estimate of the bias for the training speech signal based on maximizing a likelihood function;
  (d) subtracting the estimate of the bias from the training speech signal to obtain a tentative training speech value;
  (e) repeating steps (c) and (d), wherein each subsequent computed estimate of the bias is based on the previous tentative training speech value to arrive at a reduced bias training speech signal value;
  (f) recomputing the centroids based on the reduced biased training speech signal value to generate a new set of centroids;

(g) repeating steps (c) to (f) to compute a processed reduced bias speech signal and to generate an enhanced set of centroids;

(h) utilizing the enhanced set of centroids and the processed reduced bias speech signal as training input for a speech recognizer;

(2) testing an input speech signal to minimize the unknown bias by using the following steps:

(i) analyzing an utterance on a frame-by-frame basis;

(j) computing a sequential bias estimate for each frame of the speech signal based on maximizing a likelihood function;

(k) subtracting the sequential bias estimate from the input speech signal at every frame to obtain a tentative speech value;

(l) repeating steps (j) and (k), wherein each subsequent computed estimate of the bias is based on the previous tentative speech value, resulting in a reduced bias speech signal value; and (3) utilizing the reduced bias speech signal as input to a speech recognizer.

6. The method of claim 5, wherein the speech recognition system utilizes a Hidden Markov Model speech recognizer.

7. A method for sequentially reducing the effect of an unknown signal bias on an input speech signal during the testing phase of a speech recognition system, comprising:

(a) analyzing an utterance on a frame-by-frame basis;

(b) computing a sequential bias estimate for each frame of the speech signal based on maximizing a likelihood function by utilizing a set of centroids generated by a training model;

(c) subtracting the sequential bias estimate from the input speech signal at every frame to obtain a tentative speech value;

(d) repeating steps (b) and (c), wherein each subsequent computed estimate of the bias is based on the previous tentative speech value, resulting in a reduced bias speech signal value; and (e) utilizing the reduced bias speech signal as input to a speech recognizer.

8. The method of claim 7, wherein a vector quantization method is utilized to compute the centroids of step (b).

9. The method of claim 5, wherein step (k) includes setting a weighting coefficient.

10. The method of claim 7, wherein step (c) includes setting a weighting coefficient.

11. A method for generating an enhanced set of centroids representative of an input speech signal for use by a speech recognition system, utilizing an initial set of centroids based on a training speech signal, comprising:

(a) computing an estimate of the bias for the training speech signal based on maximizing a likelihood function;

(b) subtracting the estimate of the bias from the training speech signal to obtain a tentative training speech value;

(c) repeating steps (a) and (b), wherein each subsequent computed estimate of the bias is based on the previous tentative training speech value to arrive at a reduced bias training speech signal value;

(d) recomputing the centroids based on the reduced bias training speech signal to generate a new set of centroids; and (e) repeating steps (a) to (d) to compute a processed reduce bias speech signal to form an enhanced set of centroids.

12. The method of claim 11, further comprising utilizing the enhanced set of centroids and the processed reduced bias speech signal to train a speech recognizer.

13. The method of claim 11, further comprising:

(a) utilizing the enhanced centroids to compute an estimate of the bias for each utterance of an input speech signal based on maximizing a likelihood function;

(b) subtracting the estimate of the bias from the speech signal to obtain a tentative speech value;

(c) repeating steps (a) and (b), wherein each subsequent computed estimate of the bias is based on the previous tentative speech value, to result in a reduced bias speech signal value; and (d) utilizing the reduced bias speech signal value as input to a speech recognizer.

* * * * *